United States Patent [19]
Gick et al.

[11] Patent Number: 5,735,453
[45] Date of Patent: Apr. 7, 1998

[54] DECORATIVE NOVELTY ARTICLES

[76] Inventors: James W. Gick, 71 S. Peak, Laguna Niguel, Calif. 92677; Terri L. Gick, 3182 Colinos, Coto de Caza, Calif. 92679

[21] Appl. No.: 557,609

[22] Filed: Nov. 14, 1995

[51] Int. Cl.[6] .................................................. B42D 15/02
[52] U.S. Cl. .................... 229/92.8; 428/42.1; 428/479.6
[58] Field of Search ........................... 229/92.8; 264/153; 428/42.1, 479.6

[56] References Cited

U.S. PATENT DOCUMENTS

| | | | |
|---|---|---|---|
| 3,677,399 | 7/1972 | Tatar | 229/92.8 |
| 3,713,238 | 1/1973 | Hyman et al. | |
| 3,879,874 | 4/1975 | Broussard, Sr. | |
| 3,986,283 | 10/1976 | Pelaez | 229/92.8 |
| 4,079,881 | 3/1978 | Sabb | |
| 4,109,851 | 8/1978 | Goates | 229/92.8 |
| 4,203,516 | 5/1980 | Stonoga et al. | 229/92.8 |
| 4,662,093 | 5/1987 | Suttles et al. | |
| 4,737,329 | 4/1988 | Rakoczy | 264/153 |
| 4,883,692 | 11/1989 | Spector | |
| 4,947,566 | 8/1990 | Hoebel | |
| 4,953,780 | 9/1990 | Ross | |
| 5,248,536 | 9/1993 | Du Katz | |
| 5,382,404 | 1/1995 | Kogame | |

FOREIGN PATENT DOCUMENTS

| | | | |
|---|---|---|---|
| 395308 | 2/1909 | France | 229/92.8 |
| 10878 | 5/1906 | United Kingdom | 229/92.8 |

Primary Examiner—Stephen P. Garbe

[57] ABSTRACT

High quality, novelty articles are provided and comprise a multilayer construction of printed material sandwiching a foam board having a foam core. A preferred embodiment comprises an oversized decorative postcard suitable for sending through the U.S. mail. Alternative embodiments include keytags and business cards which are mass-produced in a die cutting manufacturing method of the present invention. These relatively inexpensive articles are of sturdy construction and may be mounted or otherwise displayed after their initial use.

10 Claims, 2 Drawing Sheets

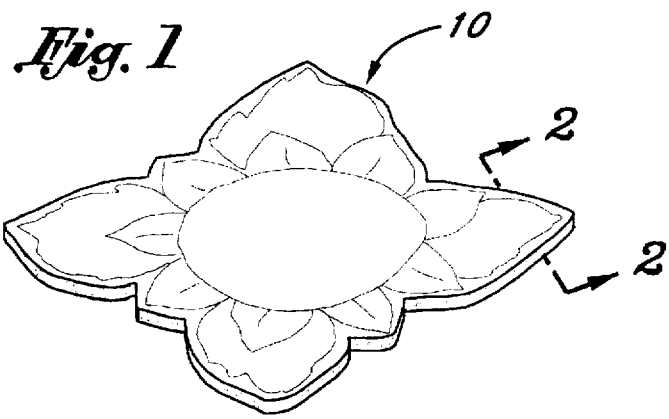
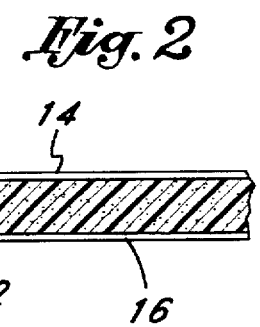
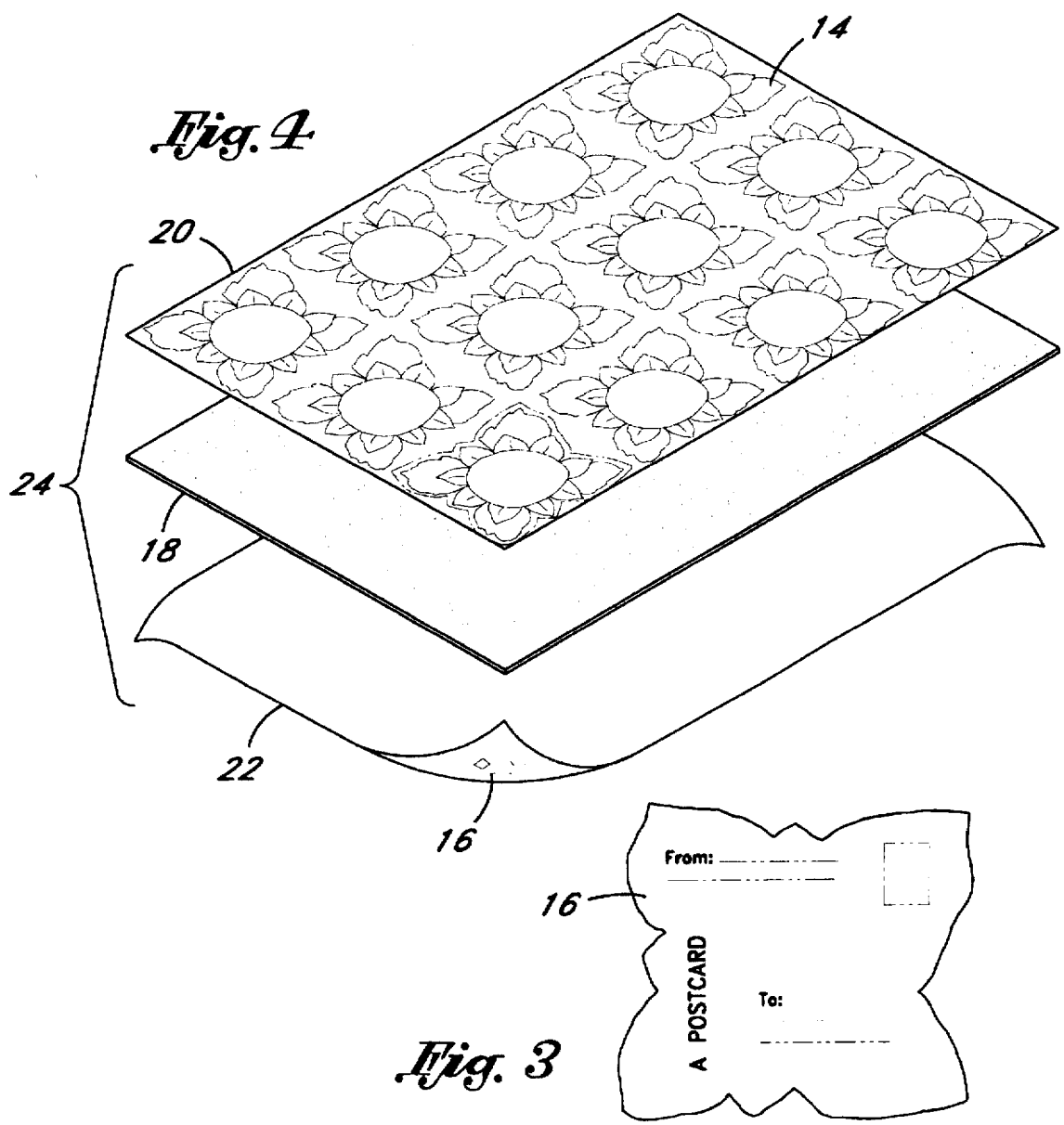

DECORATIVE NOVELTY ARTICLES

BACKGROUND OF THE INVENTION

The present invention relates to articles made from stiff foam board and methods of making them.

Currently being sold are novelty postcards made of rigid foam board or foam cored. The material has a light weight foam core and a smooth finished surface. The postcards have been provided with a decorative item on one side, such as a flower or a tree, with typical postcard headings positioned on the other side. The cards may be simple rectangles, or may have nonstraight edges that relate to the decorative aspects. For example, if a flower is being illustrated, the card may have edges consistent with a flower shape.

The articles have been relatively expensive, in that the foam board has been cut into the decorative shape by sawing or by using some other hand cutting tool. This is not only time-consuming, but also introduces irregularities and, in the case of sawing, rough edges. Also, some of the cards have been hand painted, which require considerable time and add to the expense. Others have decorations individually applied to the cut-out foam board with the result that the decoration applied to the shape cut from the foam board may not fit precisely. This, in turn, may create a somewhat unattractive and unfinished edge appearance.

Since postcards of this type are naturally more expensive than an ordinary type, part of the marketing or basis for buying such items is that they tend to be kept by the receiver as decorations. For example, the article may be mounted on the wall as a picture or hung by a string as a decorative mobile. Hence it is desirable that the article be as attractive as possible, but yet be relatively inexpensive. Accordingly, a need exists for an improved version of such decorative postcards, as well as other items, such as keytags, business cards, etc.

To meet postal regulations a postcard of foam board must be at least ¼ inch thick, so as to minimize the risk of damage or mutilation in the handling of mail. Thus the construction material and the method of making the product must be consistent with such requirements.

SUMMARY OF THE INVENTION

In accordance with the present invention there is provided a three dimensional decorative novelty article, such as a postcard suitable for mailing. The construction employed is also suitable for a wide variety of other items. In a preferred embodiment the article has a primary layer of substantially rigid foam board having a uniform thickness of at least a quarter of an inch from edge to edge and having decorated or printed outer layers precisely registered on opposite sides of the inner layer. After the outer layers have been applied to the inner one, the article is formed by gang die cutting so as to reduce cost and to form clean uniform edges.

While one of the desirable features of the article is that it is lightweight, the foam board employed should be sufficiently dense so that the article does not compress appreciably, particularly on the edges, when subjected to the die cutting pressure, so as to maintain an attractive flat surface with uniform edges. Preferably, the foam board has a nominal ⅛-inch thickness and has a density of at least six pounds per cubic foot.

In accordance with the method of manufacturing employed in making the decorative articles, the outer layers are first attached by gluing or other suitable means to opposite sides of the substantially rigid foam board layer. It is desirable that multiple articles be formed at one time and hence a large sheet of foam board is utilized with the outer layers having the same dimension. For the die cutting operation a blanket of rubber or other compressible material is placed between and around the die cutting edges to be compressed during the cutting operation between the foam board construction and a die support. When the die is withdrawn, the compressible member returns to its unrestrained shape ejecting the die cut article from the die. By blanketing substantially the entire area within the die cutting edge, the compression of the die cutting operation is distributed uniformly across the compressible member so as not to form depressions in or otherwise damage the foam board article.

BRIEF DESCRIPTION OF THE DRAWINGS

FIG. 1 is a perspective view of one embodiment of the present invention.

FIG. 2 is a cross-sectional view taken along lines 2—2 of FIG. 1.

FIG. 3 is a bottom plan view of the embodiment of FIG. 1.

FIG. 4 is an exploded perspective view of a preferred configuration of the present invention.

DETAILED DESCRIPTION OF THE PREFERRED EMBODIMENTS

Figure 5:
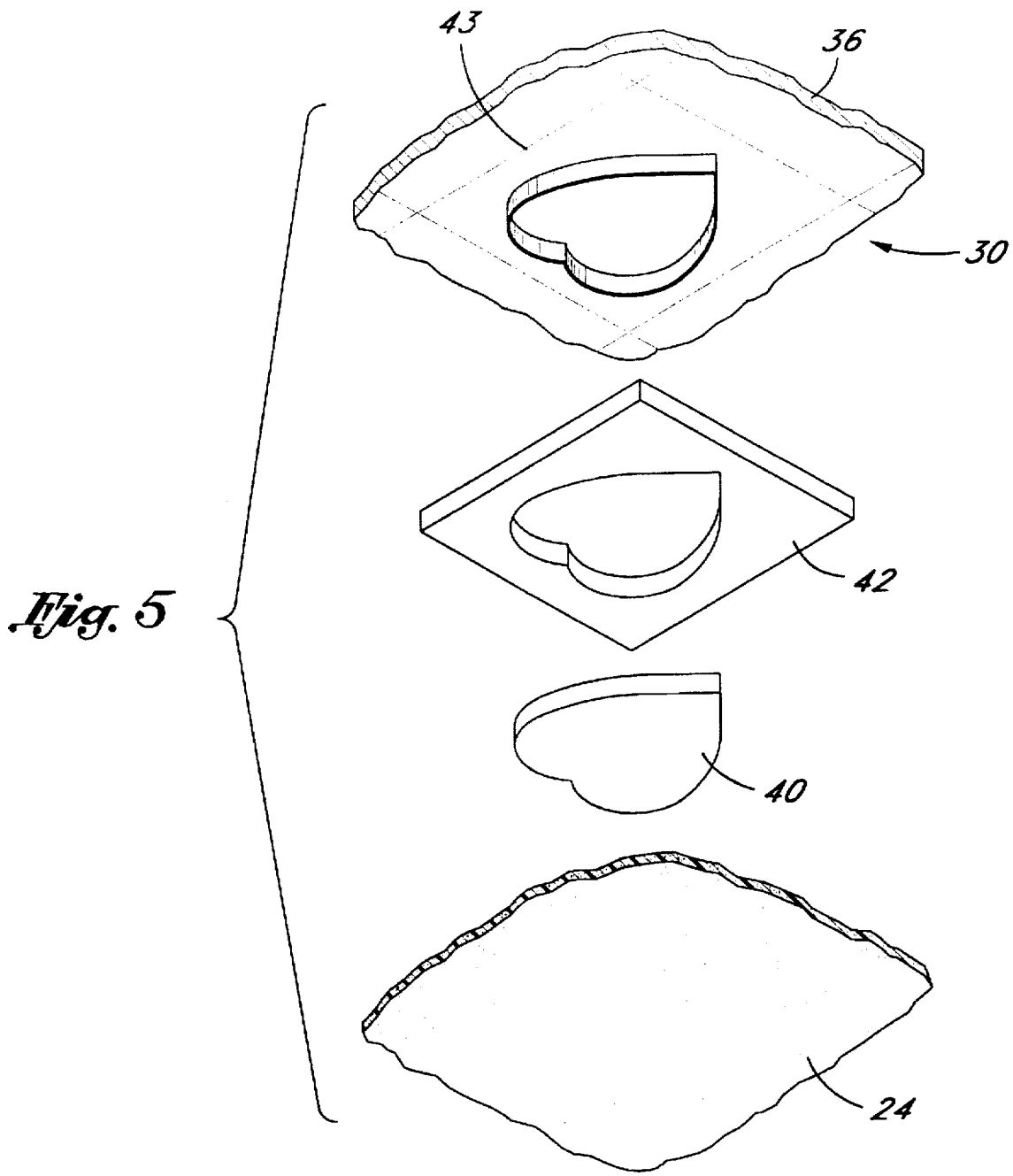
FIG. 5 is an exploded view of a preferred die used in a method of manufacturing the article of the present invention.

FIGS. 1–3 illustrate a preferred embodiment of a decorative article comprising a postcard 10 which is constructed in accordance with the present invention. The postcard 10 includes a support layer 12 of rigid foam board, a decorative layer 14 on its upper surface, and a lower layer 16 bearing postcard indicia, shown in FIG. 3.

Other articles made by or incorporating the present invention include, but are not limited to, keytags and business cards. The sturdy multilayer construction provides a unique decorative item which may be retained after its initial use and possibly mounted for display. The construction if properly made also provides a postcard which conforms to regulations of the United States Post Office for allowable mailing material, and may thus be sent through the regular mail. Among other requirements, currently items not conforming to conventional postcard or envelope sizes, and particularly three dimensional oversized material, must be at least ¼-inches in thickness to be acceptable for mailing. The articles constructed in accordance with the present invention meet or exceed this requirement.

As will be discussed in detail below in connection with FIGS. 5 and 6, a die cutting procedure is provided by the present invention to manufacture these sturdy, decorative articles 10. Thus, clean, smooth edges surrounding the decoration 14 are created which contribute to a high quality product which is manufactured at a low cost.

Referring to FIG. 4, the foam board 12 is readily available in a relatively large sheet 18, such as 3 feet by 4 feet, for example. The material is lightweight but yet is quite strong. It is available in various thicknesses, such as ¼- or ⅛-inch. The ⅛-inch thickness is preferred for postcards. A preferred material having the desired rigidity and strength is a high density foam referred to as FOAM-X brand. More specifically, the product referred to as ⅛-inch Clay Coat FOAM-X is preferred. Such material has a density of about 6.9 pounds per cubic foot, which is desirable to prevent crushing during the die cutting operation. A density in the range of 6 to 8 pounds per cubic foot is deemed adequate. Of course a denser material could be used but then the product would be heavier. If made thinner, postal regulations may be encountered. The material has an expanded polystyrene foam core with a layer of sulfite paper adhered to each side. To improve the surface finish, the paper has a coating of kaolin clay. That particular finish is not needed since additional sheets are added to the construction in accordance with the invention, but the material is readily available with the coating. The density specified above is a composite one, the foam density being less than that of the paper with clay coating. The material is available from Alucobond Technologies.

Some foam board is not sufficiently dense to withstand the compression force of a die-cutting operation. In one test of a less dense material, ⅛ inch foam board compressed so much that it was less than ¼ inch on its edges. Further, crushing the foam material too much weakens it.

The decoration 14 desired to be placed on each individual article is printed onto a thin large sheet 20 of paper or other thin material, as shown in FIG. 4. The printing may be formed by any suitable method. The large sheet 20 has the decoration 14 repeated as many times as is consistent with the size of the desired finished article 10 and the size of the large sheets 18 and 20. Thus, as shown in the drawing, the flower decoration 14 is repeated 12 times on the sheet 20. There would actually probably be many more postcard sized items on a 3 by 4 feet sheet, but fewer are shown for simplicity.

The sheet 20 is attached to the foam board sheet 18 by gluing or other suitable means. A similar large sheet 22 of paper or other material having the desired decoration or information 16 for the other side of the postcard 10 is printed and attached to the other side of the foam board 18 using an adhesive or other suitable method.

This sandwich construction 24 is then die cut as indicated to separate the individual articles 10 from the large sheet construction. A die 30 shown in FIGS. 5 and 6 is used to perform the cutting at the precise desired locations so that the decoration 14 is properly displayed on the article 10. Also, the cut created is sharp and clean so that the edges of the article 10 are smooth and properly finished without any additional processing. The die 30 may be a single one, but is preferably a multiple one, so that the entire sandwich construction comprising a plurality of articles 10 is cut at one time. Further, although a single design 14 is shown repeated in FIG. 4, it is understood that two or more different decorative designs may be repeated on the sheets 20, 22 as can be fitted thereon.

Figure 6:
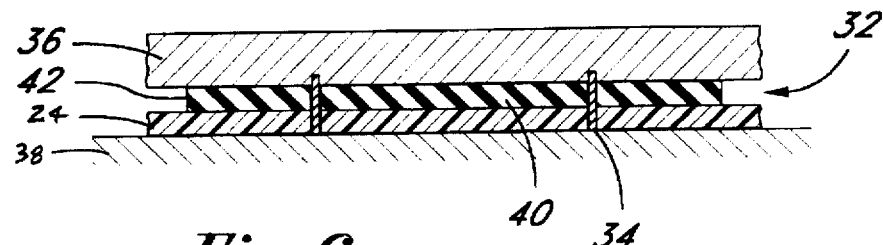
FIG. 6 is a cross-sectional view of an intermediate compression step of the manufacturing method of FIG. 5.

Referring to FIGS. 5 and 6, in a preferred method of manufacturing a plurality of decorative articles, the die 30 comprises a cutting member 34 mounted to a die support 36. Although only one cutter is shown, the number provided would be consistent with the number of articles that fit on one sheet. A compressible blanket-like member 32, having thickness approximately the same as the height of the cutting member 34, is mounted to the die support 36. The same compressible blanket material 32 includes a portion 40 within the cutter 34 and a portion 42 surrounding the cutter 34. The compressible member 40 preferably fills the area surrounded by the cutter 34. The broken lines 43 represent the die cut area for a single article, it being understood that there would be a series of such areas for a plurality of articles.

In use, the sandwich construction 24 to be cut is placed on a rigid support 38, and the die 30 is then pressed against the sandwich construction 24 such that the cutter 34 cuts it as shown in FIG. 6. The compressible member 32 is temporarily compressed between the support 36 and the construction 24, causing the blanket 32 to be reduced in thickness by approximately the thickness of the construction 24.

Withdrawing the die 30 from the support member 38 allows the compressible member 32 to return to substantially its original thickness and eject the cut article 10 from the die 30 without damage to the article 20.

The die 30 compressible member 32 is preferably rubber, although foam or other suitable material may be used. A single compressible member 32 providing coverage of the entire sheet 18 may be used, or several members 32 each covering at least one individual article 10 may optionally be used. It is important not to use smaller, conventional strips or spots of rubber material which do not cover the entire article 10 in the die cutting process because indentations may result on the finished article 10. The compressible material 42 around the cutter 34 also ejects the portions of the construction 24 from the die.

Thus, the present invention provides for mass-produced, high quality yet inexpensive decorative articles.

Although this invention has been disclosed in the context of certain preferred embodiments, it will be understood by those skilled in the art that the present invention extends beyond the specifically disclosed embodiments to other alternative embodiments of the invention. Thus, it is intended that the scope of the present invention herein disclosed should not be limited by the particular disclosed embodiments described above.

We claim:

1. A decorative article suitable for mailing without an outer envelop, said article comprising:

a first outer layer of material having a substantially planar first decorative surface;

a stiff inner layer of foam board having a substantially uniform nominal thickness of about ⅛-inches; and a second outer layer of material having a desired surface, said first outer layer secured to one surface of said inner layer such that said first decorative surface is exposed, said second outer layer secured to an opposite surface of said inner layer;

said article being die cut with a non-heated tool and having a perimeter showing said first and second outer layers and said inner layer therebetween, said perimeter after being die cut having a thickness of at least ¼-inches so as to meet postal size regulations for mailing.

2. The article of claim 1 wherein said foam board has a density such that during a die cutting operation, the foam board does not significantly compress on its edges any more than the material inward from the edges.

3. The article of claim 2 wherein said foam board has a density of about seven pounds per cubic foot.

4. The article of claim 2 wherein the foam board has a density greater than six pounds per cubic foot.

5. A novelty article, comprising:

a planar layer of foam board having an expanded polystyrene foam core with a paper liner having a coating of clay on opposite planar sides of the foam core; and a thin sheet of plastic or paper attached to each of said liners, with said thin sheets having pre-printed decorative or other material thereon, said article having cleanly cut uniform appearing edges formed by a die cutting operation with a non-heated tool, said foam board having a density such that during the die cutting operation, it does not significantly compress.

6. The article of claim 1, wherein said outer layers are attached to said inner layer before the article is die cut.

7. A combination for creating decorative articles comprising:
- a stiff sheet of foam board;
- a thin, substantially planar first outer layer attached to one side of the foam board, said layer having a plurality of decorative items formed thereon; and
- a second thin outer layer attached to an opposite side of said foam board thereby forming a sandwich construction, said second layer having a plurality of items formed thereon aligned with the items on said first layer so that when the construction is die cut with a non-heated tool into a plurality of individual articles, each has an item from said first layer on one side and item from said second layer on an opposite side.

8. The combination of claim 7, wherein said foam board has a substantially uniform nominal thickness of about ⅛" and said foam board has a density such that during a die cutting operation, it does not significantly compress.

9. The combination of claim 8, wherein said articles form novelty postcards having a perimeter thickness of at least ¼".

10. A decorative article comprising a stiff layer of foam board having a substantially planar decorative surface on one side and postcard indicia on an opposite side, said article being die cut with a non-heated tool from a larger section of said board and having a perimeter of at least ¼" inch thickness so as to meet postal size regulations for mailing.

* * * * *